(12) United States Patent
Robison et al.

(10) Patent No.: US 8,251,348 B2
(45) Date of Patent: Aug. 28, 2012

(54) CHOKE TRANSFER VALVE TRIM

(75) Inventors: Jeffrey C. Robison, Provo, UT (US); Frank Redd, Orem, UT (US)

(73) Assignee: Caldera Engineering, LC, Provo, UT (US)

( * ) Notice: Subject to any disclaimer, the term of this patent is extended or adjusted under 35 U.S.C. 154(b) by 744 days.

(21) Appl. No.: 12/361,021

(22) Filed: Jan. 28, 2009

(65) Prior Publication Data

US 2009/0189109 A1    Jul. 30, 2009

Related U.S. Application Data

(60) Provisional application No. 61/024,105, filed on Jan. 28, 2008.

(51) Int. Cl.
*F16K 1/00* (2006.01)
*F16K 15/00* (2006.01)
*F16K 47/00* (2006.01)
*F16L 55/02* (2006.01)

(52) U.S. Cl. .......................... 251/333; 251/118; 251/125

(58) Field of Classification Search .................. 251/118, 251/125, 318, 333
See application file for complete search history.

(56) References Cited

U.S. PATENT DOCUMENTS

| | | | |
|---|---|---|---|
| 1,200,668 A * | 10/1916 | Swanberg | 251/360 |
| 1,342,667 A | 6/1920 | Dougherty et al. | |
| 2,163,472 A * | 6/1939 | Shimer | 137/516.29 |
| 3,658,295 A | 4/1972 | Paine et al. | |
| 3,773,085 A * | 11/1973 | Caldwell, Jr. | 137/630.15 |
| 4,269,227 A * | 5/1981 | Araki et al. | 137/630.14 |
| 4,384,593 A * | 5/1983 | Keller | 137/630.15 |
| 5,318,270 A | 6/1994 | Detanne et al. | |
| 5,429,094 A | 7/1995 | Akiba et al. | |
| 2002/0074043 A1 | 6/2002 | Beyer et al. | |

FOREIGN PATENT DOCUMENTS

GB    980896    1/1965

OTHER PUBLICATIONS

European Search Report, EP09151510, May 20, 2009.

* cited by examiner

*Primary Examiner* — John Fristoe, Jr.
*Assistant Examiner* — Hailey K Do
(74) *Attorney, Agent, or Firm* — Snell & Wilmer L.L.P.

(57) ABSTRACT

The present invention relates to valve plugs for reducing erosion of the valve plug head and/or seat. More specifically, this invention comprises a valve plug incorporating a choke transfer trim that reduces the time of exposure of the plug head and/or seat to high velocity and high pressure drop at the interface of the plug head and seat when the valve is in the closed position. The choke transfer trim transfers the flow control area of the valve away from the plug head/seat interface to a location downstream, thereby reducing erosion at the interface between the valve plug head and/or seat that is typically used for fluid throttling and shut off.

11 Claims, 6 Drawing Sheets

CHOKE TRANSFER VALVE TRIM

CROSS REFERENCE TO RELATED APPLICATION

This application claims priority to U.S. Provisional Application 61/024,105, entitled "Choke Transfer Valve Trim", which was filed on Jan. 28, 2008 and is hereby incorporated by reference.

FIELD OF INVENTION

The present invention relates to valve plugs for reducing erosion of a valve plug head and/or seat. More specifically, this invention relates to a valve plugs using a choke transfer trim to reduce erosion in the region where the plug head and valve seat come into contact if the valve is in the closed position.

BACKGROUND OF THE INVENTION

Various valve plugs have been used for some time to control fluid flow through a conduit and/or orifice. Typically, these prior devices tend to wear away quickly in erosive process streams. Specifically, erosion caused by high velocity flow can cause the plug head and/or seat inlet to fail. Moreover, these prior devices comprise various shapes and configurations to regulate process stream flow. For example, one prior device reduces pressure in valve trim by using stages, but such trim is often limited to a clean fluid process. However, many of these shapes and configurations, although satisfactory in their ability to regulate fluid flow, experience erosion of the valve plug heads and valve seats, and such erosion may often be attributed to the repeated high velocity flow, high pressure drops, and/or corrosive process streams through a flow control area.

Choked flow can cause erosion of the plug head and/or seat and can cause the plug head and/or seat inlet to fail. Due to this possibility of failure, it is advantageous to produce a valve that reduces erosion of the valve plug head and/or seat inlet and thus increases longevity of severe duty service valves.

SUMMARY OF THE INVENTION

The present invention relates to valve plugs for reducing erosion of the valve plug head and/or seat inlet and thus increasing longevity of severe duty service valves. More specifically, in an exemplary embodiment, a valve plug comprises a choke transfer trim that reduces the time of exposure of the plug head and/or seat inlet to the high velocity and high pressure drop of a process stream. The choke transfer trim transfers the flow control area, also referred to as the minimum flow area, of the valve away from the plug head seat interface to a location downstream, thereby reducing erosion at the interface between the valve plug head and/or seat inlet that is typically used for fluid throttling and shut-off.

In an exemplary embodiment, the valve plug comprises a plug head, a plug stem configured to actuate the plug head, and a choke section comprising a plug head and a choke transfer seat. In accordance with one exemplary embodiment, the choke transfer trim comprises any geometry configured to transfer the process flow control area of the valve plug away from the clearance between the plug head and seat inlet to a location downstream.

BRIEF DESCRIPTION OF THE DRAWINGS

A more complete understanding of the present invention, however, may best be obtained by referring to the detailed description when considered in connection with the drawing figures, wherein like numerals denote like elements and wherein.

DETAILED DESCRIPTION OF EXEMPLARY EMBODIMENTS

The detailed description of exemplary embodiments of the invention herein, shows various exemplary embodiments and the best modes, known to the inventors at this time. These exemplary embodiments and modes are described in sufficient detail to enable those skilled in the art to practice the invention and are not intended to limit the scope, applicability, or configuration of the invention in any way. Rather, the following disclosure is intended to teach both the implementation of the exemplary embodiments and modes and any equivalent modes or embodiments. Additionally, all included figures are non-limiting illustrations of the exemplary embodiments and modes, which similarly avail themselves to any equivalent modes or embodiments.

Figure 1:
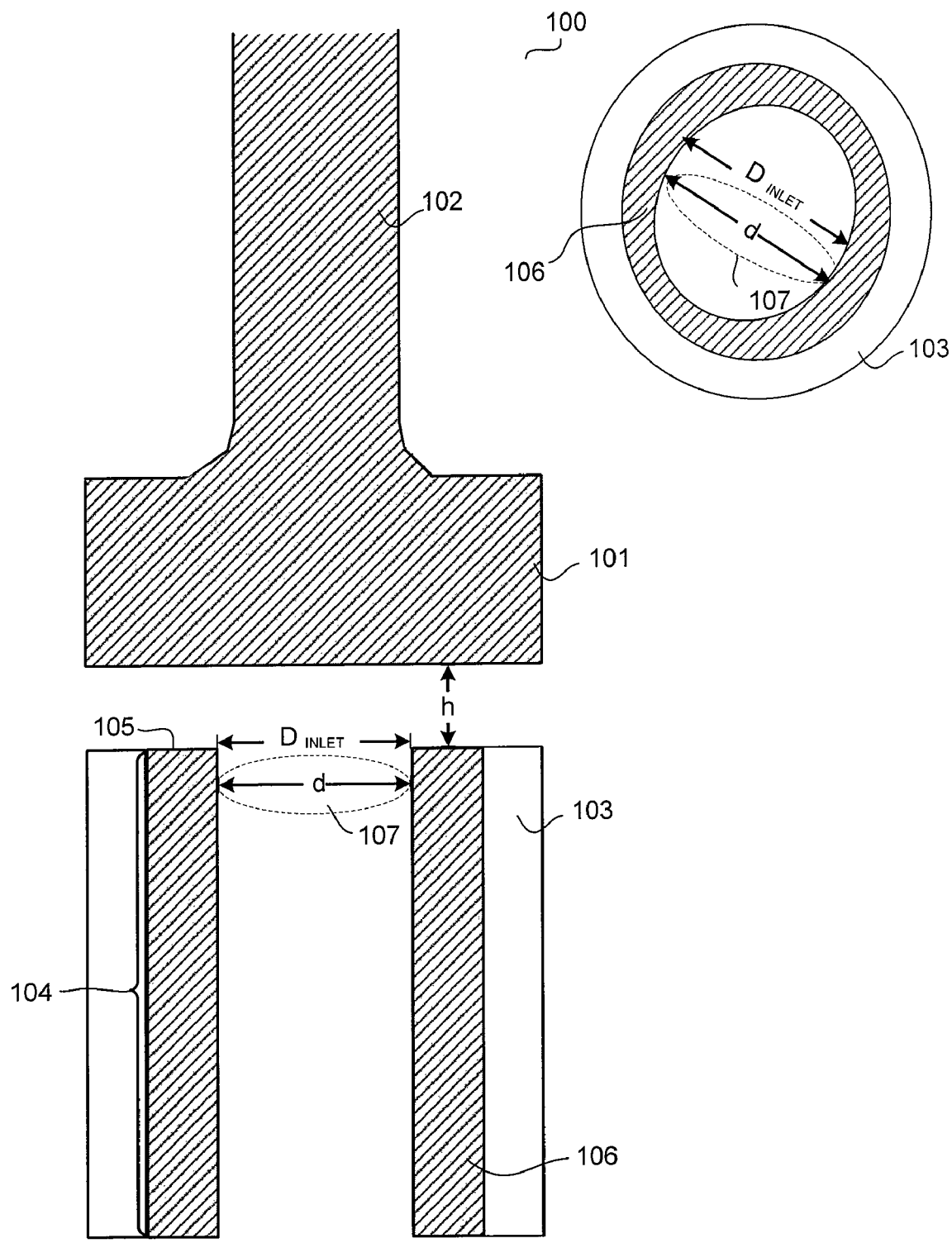
FIG. 1 illustrates a typical prior art valve plug.

FIG. 1 shows a typical prior art valve plug, which is susceptible to failure due to erosion. A typical prior art valve plug 100 comprises a plug head 101, a plug stem 102 configured to actuate plug head 101, an exterior housing 103, and a valve seat 104 comprising a seat inlet 105. The plug head seat portion 105 may be configured to be held within housing 103 such that it can interface with plug head 101 to control the volume of flow passing through the valve. This flow control is metered by adjusting the distance, "h", between seat inlet 105 and the surface of plug head 101. This distance is controlled by the actuation of plug stem 102.

Accordingly, the minimum flow area of the prior art valve plug, shown in FIG. 1, is equal to the diameter of the inlet of valve seat 104, labeled as $D_{INLET}$, adjacent to plug head 101 and seat inlet 105 interface, times $\pi$, times "h" [Prior Art Minimum Flow Area=$\pi$* $(D_{INLET})$*(h)]. As illustrated in FIG. 1, the prior art valve plugs typically comprise trim configurations 106, which position the flow control area 107 of the valve, denoted as "d", close to the interface of plug head 101 and seat inlet 105, thereby exposing the plug head and/or seat inlet to erosion and possible valve trim failure. Stated another way, the minimum flow area 107 and the inlet to the valve inlet 104 are at substantially the same location.

Figure 6:
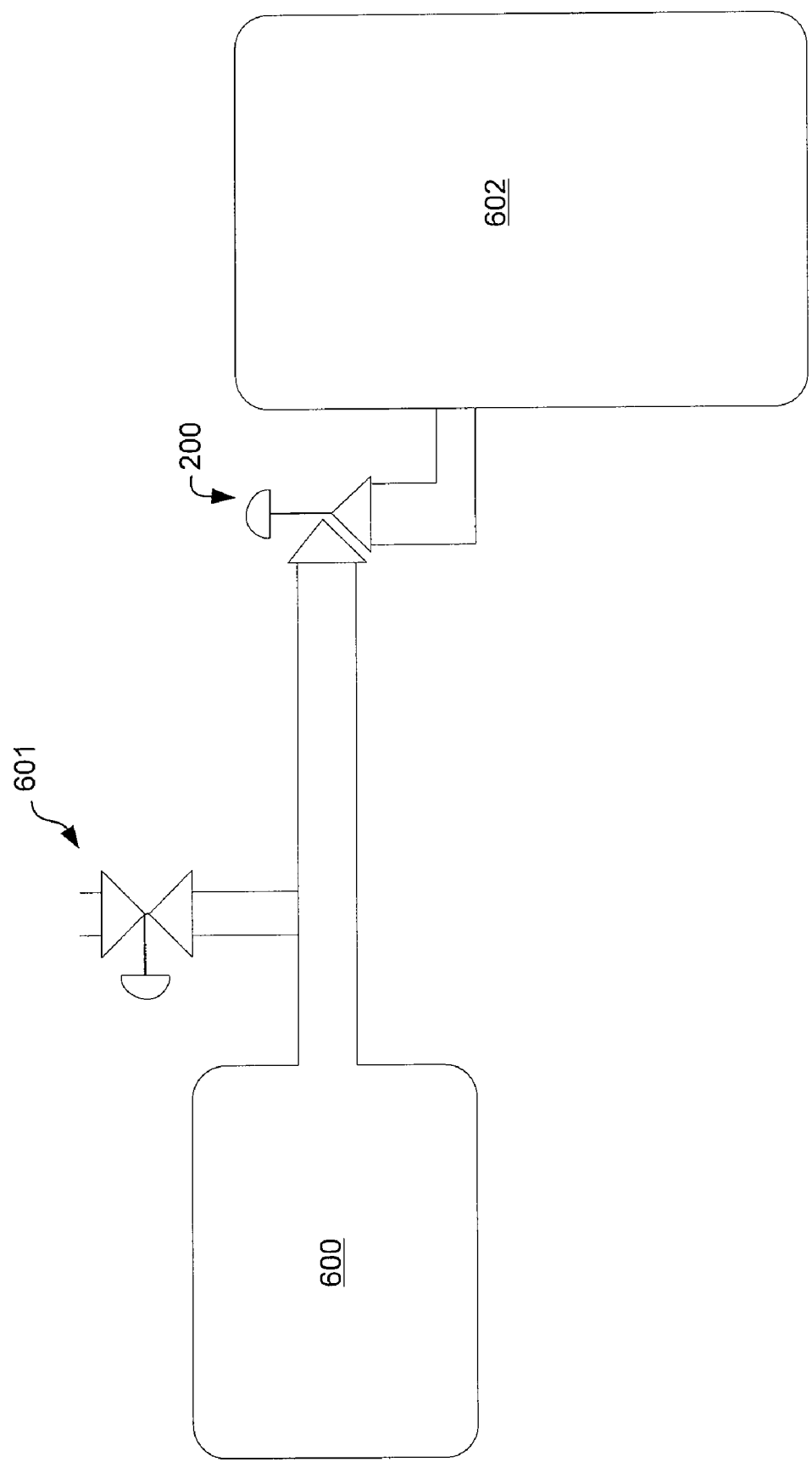
FIG. 6 illustrates an exemplary embodiment of a choke transfer valve assembled with a process vessel.

In an exemplary embodiment, and with reference to FIG. 6, a process system comprises a process vessel 600, an injection valve 601, a blowdown vessel 602, and a valve plug 200. The injection valve 601 controls the pressure and/or temperature of process vessel 600. For example, a high pressure steam may be injected into process vessel 600, thereby raising the temperature and the pressure. In accordance with an exemplary embodiment, valve plug 200 is configured to substantially shut off any leakage through the valve while process vessel 600 is pressurized. Furthermore, in another embodiment, valve plug 200 is configured to open quickly to allow for a rapid release of the pressure of process vessel 600 into blowdown vessel 602. Opening quickly can be opening the valve plug within one second or less, though other opening times are suitable as determined by how the valve plug is used.

In yet another exemplary embodiment, valve plug 200 is configured to handle a "non-clean fluid" process. In other words, various materials may exit through valve plug 200 and into blowdown vessel 602 without clogging or substantially impairing the valve. For example, in one embodiment, food products are contained in process vessel 600. Parts of the food products and/or dirt may be included in the material that passes through valve plug 200.

Figure 2:
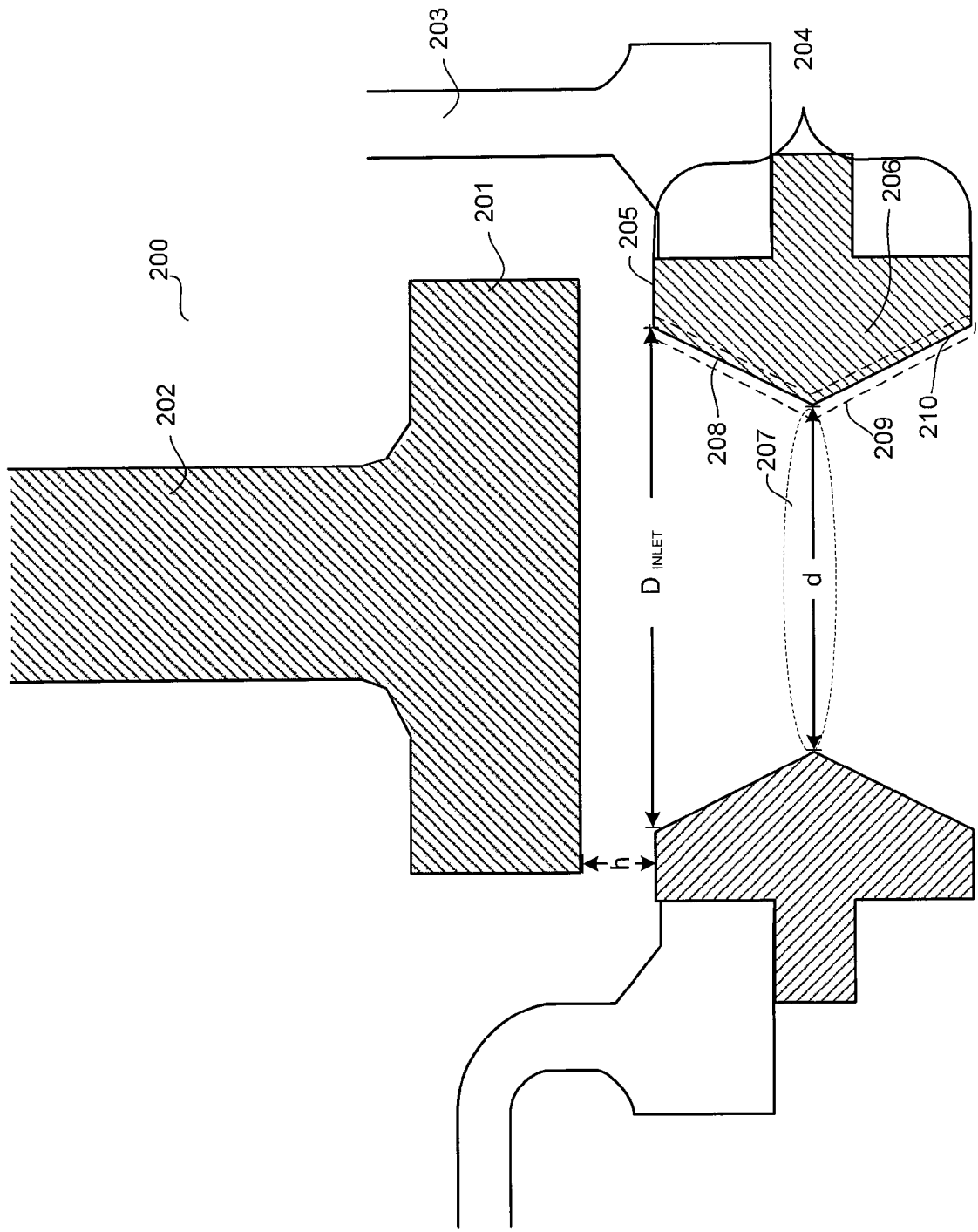
FIG. 2 illustrates a valve plug with a choke transfer trim assembly in accordance with an exemplary embodiment of the present invention.
Figure 3:
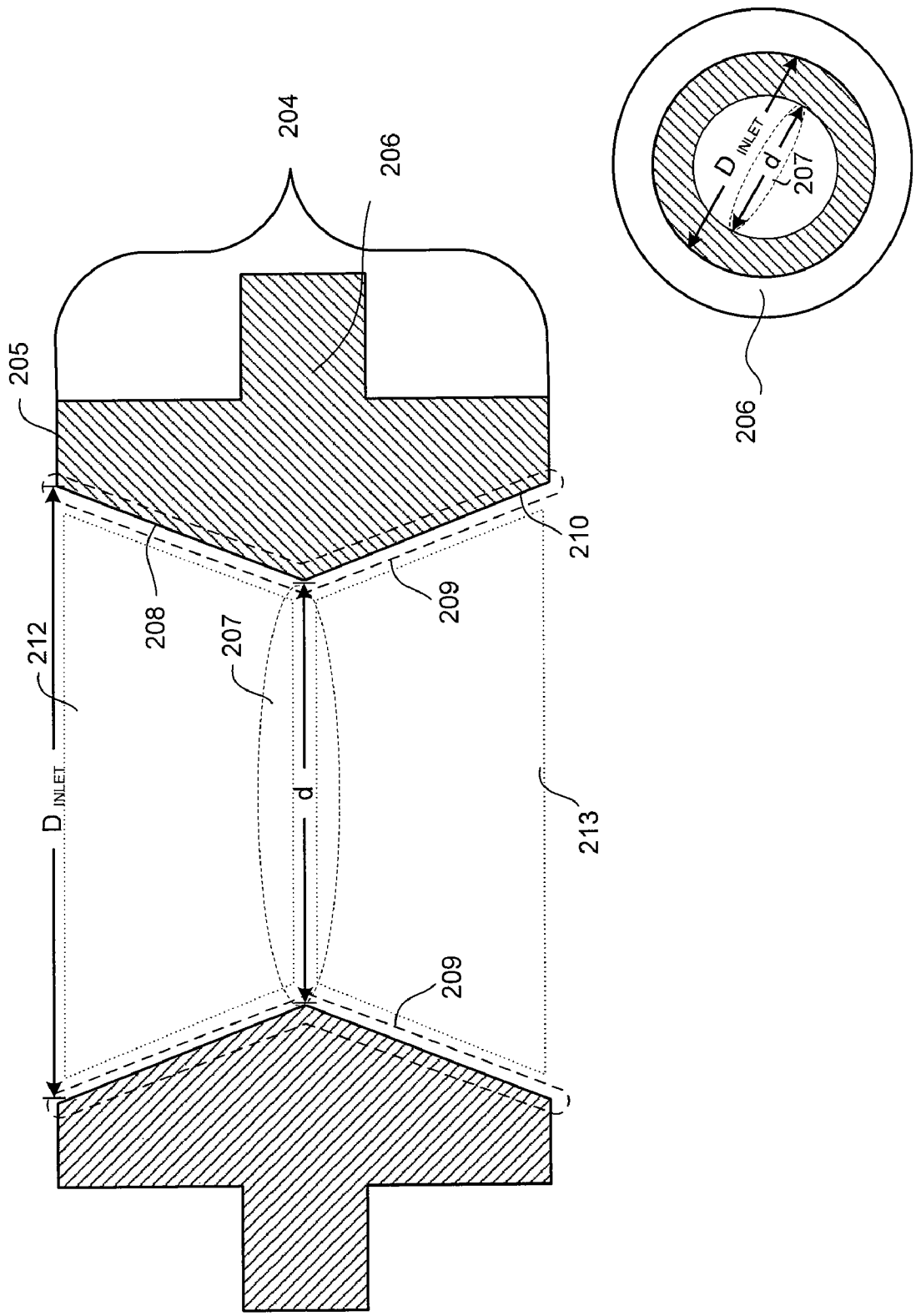
FIG. 3 illustrates a choke transfer trim assembly in accordance with an exemplary embodiment of the present invention.

In accordance with an exemplary embodiment, and with reference to FIG. 2, a valve plug 200 comprises a plug head 201, a plug stem 202 configured to actuate the plug head, a housing 203, and a valve seat 204 (also referred to as the choke section) comprising a seat inlet 205 and a choke transfer trim portion 206. In the exemplary embodiment, the flow control area 207, also referred to as the minimum flow area or reduced flow area, is the location in a fluid stream where the flow area of the valve plug is minimal. In accordance with an exemplary embodiment of this invention, both FIG. 2 and FIG. 3 illustrate a side view, cross-section of valve device 200.

In an exemplary embodiment, plug head 201 can be coupled to plug stem 202 by at least one of a compliant ring, a screw, a rivet, a bolt, a vise, a press fit, a glued joint, any weld, or any suitable means for coupling plug head 201 to plug stem 202 now known or hereinafter devised.

Furthermore, in accordance with an exemplary embodiment, plug stem 202 and/or housing 203 may comprise any metal and/or ceramic material. In an exemplary embodiment, plug stem 202 and/or housing 203 may comprise, but are not limited to, titanium and its alloys, zirconium and its alloys, niobium and its alloys, titanium-niobium alloys, alloy steels, carbon steels, iron-base superalloys, stainless steels, nickel and its alloys, nickel-base superalloys, copper based alloys, cobalt alloys, cobalt-base superalloys, aluminum and its alloys, magnesium alloys, tantalum and the like. Moreover, alternative materials with similar properties can be substituted without departing from the concept of this invention.

Additionally, in accordance with another exemplary embodiment, seat inlet 205 comprises any erosion/corrosion resistance materials and/or any shock absorption materials. In an exemplary embodiment, at least a portion of seat inlet 205 comprises at least one of a metal and a ceramic. Structural ceramics include, but are not limited to at least one of a silicon carbide, a silicon nitride, an alumina, a zirconia, a tungsten carbide, a whisker-reinforced blends of ceramics, a two-phase ceramics and the like. In an exemplary embodiment, metals include, but are not limited to at least one of a cast iron, a silicon iron, a white iron, a heat treated martensitic steel (such as 440 or 416 grade steel), and a CrCoFe alloy (such as stellite #3, stellite #6, and stellite #12).

In this exemplary embodiment, plug stem 202 further couples to an actuating device. This actuating device can be any device configured to move plug stem 202, thereby changing the distance between the top surface of seat inlet 205 and plug head 201.

In accordance with an exemplary embodiment, the valve plug may be used in on/off applications discussed above with a decreased rate of erosion and an increased service lifecycle by transferring the minimum flow area from the plug head 201 and/or seat inlet 205. For example, with reference to FIG. 4, in accordance with an exemplary embodiment, the minimum flow area of the presently disclosed valve is equal to the square of half of the diameter of the narrowest part of valve seat 204, labeled as "d", downstream of plug head 201 and seat inlet 205 interface, times π: [Minimum Flow Area=$\pi*(d/2)^2$].

Unlike the prior art valve plugs, an exemplary plug head transfers the minimum flow area of the valve away from plug head 201 and/or seat inlet 205 to a location downstream, thus reducing erosion of the valve plug head and/or seat inlet and thus increasing longevity of severe duty service valves. Specifically, unlike the prior art valve plugs, in accordance with an exemplary embodiment, and with reference to FIG. 2, valve plug 200 comprises a choke transfer trim portion 206 configured to transfer the flow control area 207 of the valve away from plug head 201 and/or seat inlet 205 to a location downstream.

Figure 4:
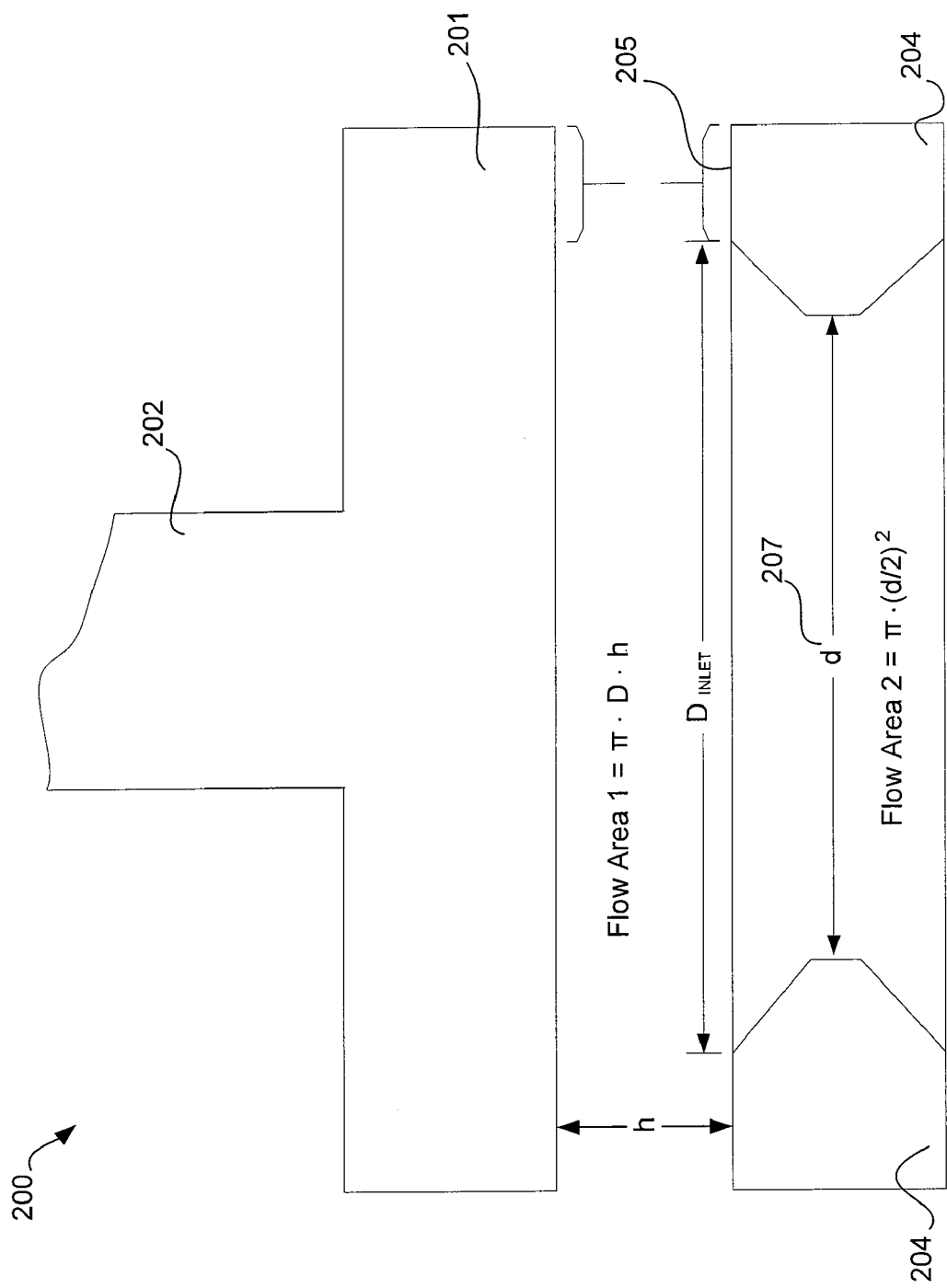
FIG. 4 illustrates another exemplary embodiment of a choke transfer trim assembly.
Figure 5A:
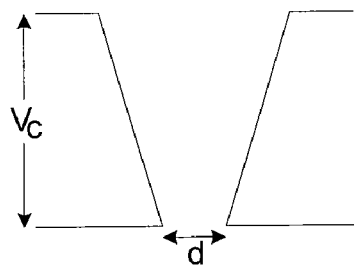
FIGS. 5A-5F illustrate various exemplary embodiments of a choke transfer trim assembly.
Figure 5B:
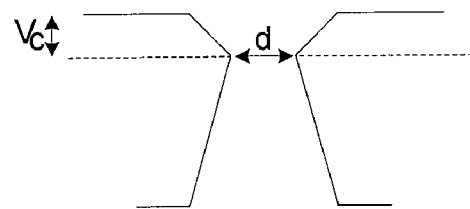
Figure 5C:
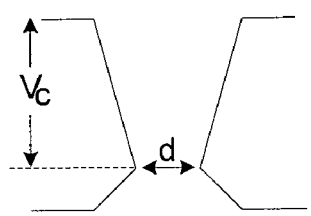
Figure 5D:
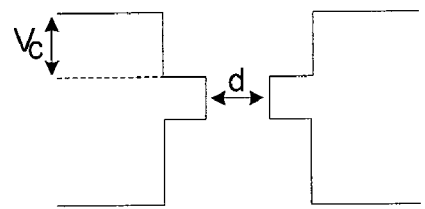
Figure 5E:
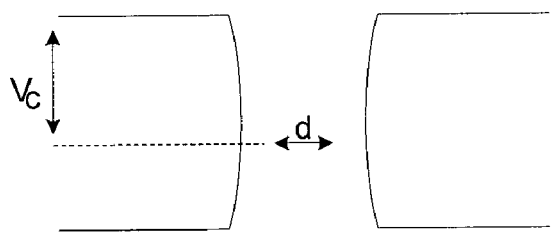
Figure 5F:
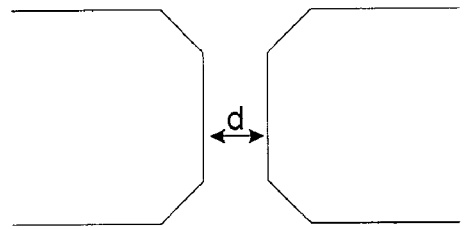

As stated above, and with reference now to FIG. 3 and FIG. 4, in accordance with an exemplary embodiment, valve plug 200 comprises a choke transfer trim 206 configured to transfer the flow control area 207 of the valve, again, denoted by "d" in FIG. 3, away from plug head 201 and/or seat inlet 205 to a location downstream. In accordance with one exemplary embodiment, choke transfer trim 206 comprises any geometry configured to facilitate transferring the flow control area 207 to a location downstream. In accordance with an exemplary embodiment, if the minimum flow area, $[\pi*(d/2)^2]$, is less than the inlet flow area, which is the same as the prior art valve device's minimum flow area, $[\pi*(D_{INLET})*(h)]$, the erosive environment is shifted away from the plug head/seat inlet interface (the surfaces required for shutting off the fluid flow). In other words, the minimum flow area is between the plug head and the seat inlet until that area exceeds the flow area created by the minimum diameter, d, of the choke transfer trim 206. In accordance with an exemplary embodiment of this invention, the shape of the choke transfer trim 206 can comprise any shape suitable for creating a minimum flow area, $[\pi*(d/2)^2]$, which is less than the inlet flow area, same as prior art valve device's minimum flow area, $[\pi*(D_{INLET})*(h)]$. For example, and in accordance with an exemplary embodiment, the shape of choke transfer trim 206 can comprise can at least one of a rounded, a tapered, and a stepped shape.

Moreover, in accordance with an exemplary embodiment, choke transfer trim 206 may comprises a top portion 208, which is closest to the plug head inlet, $D_{INLET}$, an inner surface 209 configured to interface with fluid flow, which runs the length of valve seat 204, and a bottom portion 210, which is located closer to the exit of valve seat 204.

The distance at the inlet of valve seat 204 from one side of the top portion 208 to the opposite side of the top portion 208 of the choke transfer trim 206 is denoted by $D_{INLET}$ in FIG. 3. Preferably, in accordance with an exemplary embodiment, choke transfer trim 206 has a circular cross-sectional shape, thus $D_{INLET}$ is the diameter of the inlet of valve seat 204. In accordance with an exemplary embodiment, the inlet to choke transfer trim 206, $D_{INLET}$, may comprise any cross-sectional geometry suitable for passage of a fluid stream.

In an exemplary embodiment, inner surface 209 is configured to interface with the fluid flow. The shape of inner surface 209 may comprise any shape and/or geometry that transfers the flow control area 207 of the valve away from plug head 201 and/or seat inlet 205 to a location downstream, thereby decreasing the rate of erosion and a increasing the shut off and service life of the plug head and/or seat. Preferably, as illustrated in FIG. 3 and in accordance with an exemplary embodiment, inner surface 209 may define a cone shape. For example, the symmetric inner surfaces 209 of choke transfer trim 206 may comprise two overlapping and inverted cone shaped trim sections, wherein the first cone shaped trim section 212 is widest at the inlet of valve seat 204, $D_{INLET}$, and narrowest at the flow control area 207 of the valve, "d", and wherein the second cone shaped trim section 213 is narrowest at the flow control area 207 of the valve, "d", and widest at the outlet of valve seat 204. In other words, inner surface 209 may resemble an hourglass shape configured to transfer the flow control area 207 of the valve away from the plug head and/or seat to a location downstream, thereby decreasing the rate of erosion and a increasing the life of the plug head and/or seat.

Via comparison of FIG. 1 and FIG. 3, it should be understood that any choke transfer trim 206 geometry or shape that transfers the flow control area 207 of the valve away from the inlet of valve seat 204, $D_{INLET}$, is contemplated herein and will allow for decreasing the rate of erosion and increasing the service life of the plug head and/or plug head seat. Preferably, in accordance with an exemplary embodiment of this invention, the cross-sectional flow area is maintained such that the flow area between plug head 201 and seat inlet 205, defined as $[\pi * D_{INLET} * h]$, is greater than or equal to the flow area of the flow control area, defined as $[\pi*(d/2)^2]$. In another exemplary embodiment, flow control area 207 of the valve, "d", is a percentage of the inlet of valve seat 204, $D_{INLET}$, in the range of about 20% to about 95%. For example, if $D_{INLET}$ is 20 inches in diameter, and d is 90% of the inlet diameter, then d would be 19 inches in diameter.

In an exemplary embodiment, and with reference to FIG. 5, flow control area 207 of valve plug 200 may have various configurations. The minimum flow area may be at any point of inner surface 209 of valve seat 204 that is not the interface of plug head 201 and seat inlet 205. As illustrated in FIGS. 5A-5C, the flow control area may be at the end of valve seat 204, or about ¼ of the distance from either end of valve seat 204. Furthermore, the minimum flow area may be formed by more than an angled inner surface 209. In an exemplary embodiment, and with reference to FIGS. 5D-5F, inner surface 209 may be curved, tapered with a substantially straight portion, or comprise a protruding shape.

In accordance with an exemplary embodiment and for the purpose of a specific example, the $D_{INLET}$ of valve seat 204 is about 0.1 inches to about 24 inches, depending on the specific valve application. Moreover in an exemplary embodiment, the $D_{INLET}$ of valve seat 204 is any other suitable distance.

Additionally, as illustrated in FIG. 2 and FIG. 3 and in accordance with an exemplary embodiment, the distance from $D_{INLET}$ to flow control area 207, "d," of the choke transfer trim 206 is about 0.1 inches to about 24 inches, depending on the specific valve application. Moreover, in an exemplary embodiment, the distance from $D_{INLET}$ to the flow control area 207, "d," of the choke transfer trim 206 is any other suitable distance. Also, in accordance with an exemplary embodiment, the outer diameter of choke transfer trim 206 is about 0.1 inches to about 24 inches, depending on the specific valve application. Moreover, in an exemplary embodiment, the outer diameter of choke transfer trim 206 is any other suitable distance.

Finally, as used herein, the terms "comprise", "comprises", "comprising", "having", "including", "includes", or any variation thereof, are intended to reference a non-exclusive inclusion, such that a process, method, article, composition or apparatus that comprises a list of elements does not include only those elements recited, but can also include other elements not expressly listed and equivalents inherently known or obvious to those of reasonable skill in the art. Other combinations and/or modifications of structures, arrangements, applications, proportions, elements, materials, or components used in the practice of the instant invention, in addition to those not specifically recited, can be varied or otherwise particularly adapted to specific environments, manufacturing specifications, design parameters or other operating requirements without departing from the scope of the instant invention and are intended to be included in this disclosure.

Moreover, unless specifically noted, it is the Applicant's intent that the words and phrases in the specification and the claims be given the commonly accepted generic meaning or an ordinary and accustomed meaning used by those of reasonable skill in the applicable arts. In the instance where these meanings differ, the words and phrases in the specification and the claims should be given the broadest possible, generic meaning. If it is intended to limit or narrow these meanings, specific, descriptive adjectives will be used. Absent the use of these specific adjectives, the words and phrases in the specification and the claims should be given the broadest possible meaning. If any other special meaning is intended for any word or phrase, the specification will clearly state and define the special meaning.

We claim:

1. A choked flow valve plug comprising:
    a plug head and a valve seat configured to regulate a fluid flow, wherein said valve seat comprises a seat inlet and a choke transfer trim; and
    a flow control diameter defined by said choke transfer trim, wherein said flow control diameter chokes said fluid flow downstream of said seat inlet;
    wherein $\pi * D_{inlet} * h$ is greater than or equal to $\pi*(d/2)^2$, wherein the distance between said plug head and said seat inlet is denoted as "h", and the inlet valve diameter is denoted as "$D_{inlet}$," and the width of said flow control diameter is denoted as "d".

2. The choked flow valve plug of claim 1, wherein said choke transfer trim comprises any geometry configured to transfer said flow control diameter downstream from said plug head and said seat inlet.

3. The choked flow valve plug of claim 1, wherein said choke transfer trim comprises an inner surface configured to interface with fluid flow;
    further comprising a top portion closest to said seat inlet and a bottom portion located at the exit of said choke section,
    wherein said top portion and said bottom portion of said inner surface are cone shaped such that said top portion defines a top cone with the largest diameter cross-section closest to said seat inlet and said bottom portion defines a bottom cone with the largest diameter cross-section closest to the exit of said choke section and
    wherein said top cone and said bottom cone intersect to define said flow control diameter.

4. The choked flow valve plug of claim 1, wherein said flow control diameter is about 0.1 inches to about 24 inches downstream of said seat inlet.

5. The choked flow valve plug of claim 1, wherein said flow control diameter is about 0.1 inches to about 24 inches wide.

6. The choked flow valve plug of claim 1, wherein said flow control diameter is not located at said seat inlet.

7. A choke section for a substantially flat valve plug comprising:
    a seat inlet configured to interface with a plug head to regulate a non-clean fluid flow;
    a choke transfer trim configured to choke said non-clean fluid flow; and
    a flow control diameter defined by said choke transfer trim, wherein said flow control diameter chokes said non-clean fluid flow downstream of said seat inlet, wherein $\pi*D_{inlet}*h$ is greater than or equal to $\pi*(d/2)^2$, wherein the distance between said plug head and said seat inlet is denoted as "h", and a seat inlet valve diameter is denoted as "$D_{inlet}$," and the width of said flow control diameter is denoted as "d".

8. The choke section of claim 7, wherein said choke transfer trim comprises any geometry configured to transfer said flow control diameter downstream from the interface of said plug head and said seat inlet.

9. The choke section of claim 7, wherein said flow control diameter is about 0.1 inches to about 24 inches downstream of said seat inlet.

10. The choke section of claim 7, wherein said choke transfer trim comprises an inner surface configured to interface with fluid flow further comprising a top portion closest to said seat inlet and a bottom portion located at the exit of said choke section, wherein said top portion and said bottom portion of said inner surface are cone shaped such that said top portion defines a top cone with the largest diameter cross-section closest to said seat inlet and said bottom portion defines a bottom cone with the largest diameter cross-section closest to the exit of said choke section and wherein said top cone and said bottom cone intersect to define said flow control diameter.

11. The choke section of claim 7, wherein said flow control diameter is about 0.1 inches to about 24 inches wide.

* * * * *